United States Patent
Willinger et al.

[19]

[11] Patent Number: 5,806,464
[45] Date of Patent: Sep. 15, 1998

[54] MODULAR PET FURNITURE

[75] Inventors: Jonathan Willinger, Tenafly, N.J.; Simon Handelsman, Newburyport, Mass.

[73] Assignee: J.W. Pet Company, Inc., Englewood, N.J.

[21] Appl. No.: 813,665

[22] Filed: Mar. 7, 1997

[51] Int. Cl.$^6$ .................................................. A01K 1/035
[52] U.S. Cl. .......................................... 119/706; 119/708
[58] Field of Search .................................. 119/702, 706, 119/707, 708

[56] References Cited

U.S. PATENT DOCUMENTS

| | | | |
|---|---|---|---|
| D. 220,843 | 6/1971 | Cook | 119/706 |
| D. 222,276 | 10/1971 | Hughes . | |
| D. 224,686 | 8/1972 | Michlap | 119/706 |
| D. 225,610 | 12/1972 | Fodor | D30/158 |
| D. 233,844 | 12/1974 | Tucker . | |
| D. 257,293 | 10/1980 | Michalski | D30/160 |
| D. 261,186 | 10/1981 | Michalski | D30/160 |
| D. 298,577 | 11/1988 | Faxon | D30/108 |
| D. 318,150 | 7/1991 | Eitel et al. | D30/160 |
| D. 336,557 | 6/1993 | Wade | D30/160 |
| D. 338,987 | 8/1993 | Eroyan | D30/160 |
| 2,005,817 | 6/1935 | Yoder . | |
| 2,143,592 | 1/1939 | Baldeck . | |
| 2,997,019 | 8/1961 | Bryson . | |
| 3,479,990 | 11/1969 | Crow . | |
| 3,479,991 | 11/1969 | Lichtenberger . | |
| 3,595,209 | 7/1971 | Parker | 119/706 |
| 3,604,397 | 9/1971 | Salerno | 119/706 |
| 4,047,502 | 9/1977 | Gordon, Jr. | 119/706 |
| 4,253,423 | 3/1981 | Kaplan | 119/706 |
| 4,577,590 | 3/1986 | Skroch | 119/706 |
| 4,588,123 | 5/1986 | Plew | 232/39 |
| 4,790,265 | 12/1988 | Manson | 119/706 |
| 4,930,448 | 6/1990 | Robinson | 119/708 |
| 5,148,769 | 9/1992 | Zeleinger | 119/708 |
| 5,339,770 | 8/1994 | Haffner | 119/708 |
| 5,465,682 | 11/1995 | Chavallo, Jr. | 119/707 X |
| 5,577,465 | 11/1996 | Cook | 119/706 X |
| 5,577,466 | 11/1996 | Luxford | 119/706 |

FOREIGN PATENT DOCUMENTS

| | | | |
|---|---|---|---|
| 3903473 | 8/1989 | Germany | 119/706 |
| 8101728 | 12/1981 | Netherlands | 119/706 |

*Primary Examiner*—Michael J. Carone
*Assistant Examiner*—Elizabeth Shaw
*Attorney, Agent, or Firm*—Helfgott & Karas, P C.

[57] ABSTRACT

One or more vertical columns constructed from a series of interconnected column segments support one or more platforms upon which a pet may rest. Tubular column segments are interconnected within mating sockets provided on the platforms as well as on lateral connectors used for interconnecting and mutually supporting adjacent modular columns. Each platform as well as the entire column upon which each platform is supported may be rotated to any desired angle with respect to an adjacent support column to vary the size and configuration of the assembly.

25 Claims, 7 Drawing Sheets

MODULAR PET FURNITURE

BACKGROUND OF THE INVENTION

1. Field of the Invention

The present invention relates in general to pet furniture and, in particular, to a free standing, multi-level platform assembly including at least one segmented column supported by a weighted base.

2. Description of Prior Developments

Pet furniture has been available in numerous configurations and various sizes to suit the needs and preferences of various animals. While such furniture generally performs satisfactorily, individual furniture pieces are typically available in one fixed shape and size and are incapable of being reconfigured or interconnected with other furniture pieces.

In some cases, it is desirable to change the shape of pet furniture for a particular pet or pets or to adapt the furniture to fit within a limited or odd shaped floor space. In other cases, it is desirable to expand the furniture to accommodate additional pets or to reduce the size of the furniture to accommodate fewer pets or a single pet. These options are not generally offered by conventional, fixed shaped pet furniture.

It is further desirable to be able to easily modify the shape and size of pet furniture without the use of loose hardware such as threaded fasteners or specialized connectors and without the use of hand tools. This convenience allows a pet owner to quickly and easily adapt the furniture for a particular situation and eliminates the use of loose fasteners.

Accordingly, a need exists for pet furniture which is easy to assemble and disassemble and which can be configured in numerous shapes to suit a particular pet or to fit within a particular floor space.

A further need exists for pet furniture which may be expanded or contracted in modular fashion to accommodate more or less pets.

A still further need exists for pet furniture which provides a plurality of perches or platforms from which a pet may select a resting place.

SUMMARY OF THE INVENTION

The present invention has been developed to fulfill the needs noted above and therefore has as an object the provision of modular pet furniture which may be quickly and easily assembled, modified in shape and disassembled by hand.

Another object of the invention is the provision of modular pet furniture which may be expanded or downsized in modular fashion or configured to fit within a limited or odd shaped floor space.

Another object of the invention is the provision of modular pet furniture which allows individual modules to be rotated about a support and held in a selected position with a simple friction fit.

These and other objects are met by the present invention which includes a weighted base, a central segmented support column attached to the base, and a plurality of modular elements such as platforms or connectors adjustably supported on the support column. The platforms provide perches upon which a pet may rest and the connectors interconnect one column with another for mutual support. The support column is assembled in sections with a platform or connector being interposed between adjacent column segments.

The interconnections between the base, column, connectors and platforms are preferably rotatable friction-fit connections that are easily effected by hand and without the need for additional fasteners or hand tools. Carpet or other soft surfaces of the base, the central support column, the connectors and the platforms for added pet comfort and for providing scratching surfaces to encourage scratching of the pet furniture instead of household furniture.

Additional support columns, platforms and bases may be interconnected to form a modular construction which may be arranged in a virtually unlimited number of configurations. For example, platforms may be interconnected between adjacent support columns to provide greater stability than cantilevered platforms.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings

In the various figures of the drawings, like reference characters designate like parts.

DETAILED DESCRIPTION OF THE PREFERRED EMBODIMENTS

Figure 1:
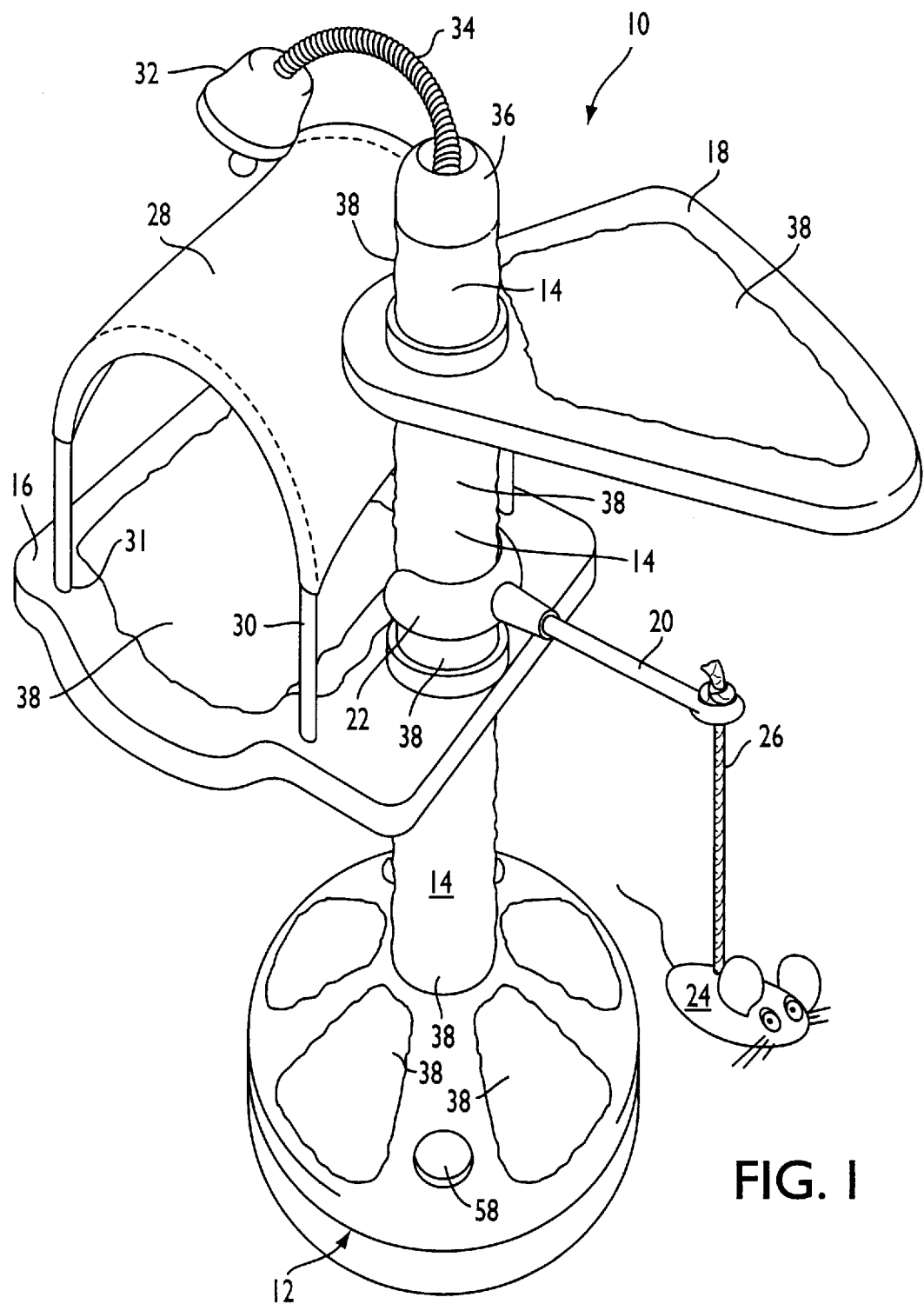
FIG. 1 is a perspective view of a first embodiment of a a modular pet furniture assembly constructed in accordance with the present invention.

The present invention will now be described in conjunction with the drawings beginning with FIG. 1 which depicts a modular pet furniture assembly 10 constructed in accordance with a first embodiment of the invention. Assembly 10 includes a base 12, a multi segmented central support column 14, a first or lower platform 16 and a second or upper platform 18, with each platform cantilevered on the support column.

A cantilevered arm 20 is removably and adjustably mounted to the central column 14 by a C-shaped base 22 which may be resiliently snap-fit around the central column with a simple manually applied force to grasp and pinch the central column. Once attached to the central column 14, arm 20 may be rotated by hand around the column to any position desired. A pet toy 24 such as a stuffed mouse may be suspended from arm 20 by a cord 26 to provide amusement for a pet.

A canopy or roof 28 may be attached to platform 16 by the simple insertion of canopy rods into bores 31 provided in the platform. A bell or other pet amusement device 32 may be attached to the top of the central column 14 by a flexible support 34 such as a coil spring. The base of support 34 is attached to the column 14 by a cap 36 which is manually fitted over the top of the column.

A soft material 38 such as carpeting, cloth or the like, may be provided on selected surfaces of the base 12, central column 14 and the platforms 16,18. Soft material 38 provides a comfortable padded surface on platforms 16,18 upon which a pet can rest and also provides a convenient scratching surface on base 12 and central column 14.

Figure 2:
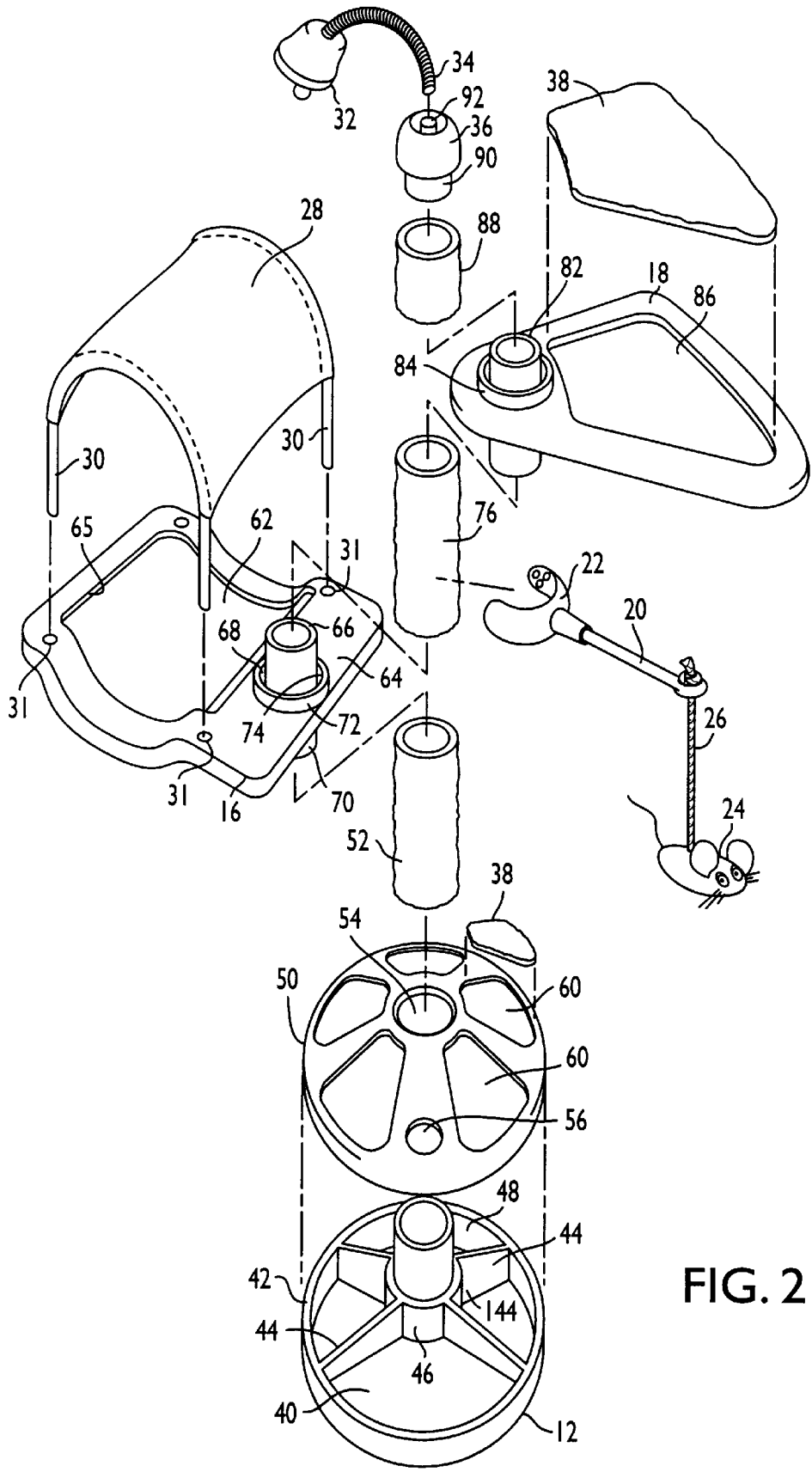
FIG. 2 is an exploded view of FIG. 1 showing the details of the individual modules and their interfitting connector surfaces.

Details of the individual modular units of assembly 10 are shown in FIG. 2 wherein base 12 is shown having a circular floor 40 surrounded by a cylindrical vertical outer wall 42. A plurality of internal struts 44 project upwardly from the center of floor 40. Each strut interconnects a central cylindrical bore wall 46 with the outer wall 42 and thereby provides mutual support to the outer wall 42 and bore wall 46.

A cylindrical tube 48 is snugly fitted within bore wall 46 for both centering the domed base cover 50 on base 12 and for providing a support sleeve over which the lower cylindrical tubular segment 52 of the central support column 14 is telescopically and concentrically aligned.

Base cover 50 is formed with a central circular alignment bore 54 which is positioned around tube 48 during assembly. Cover 50 may be snap fit to base 12 with an interference fit or attached in any other conventional fashion. A filling port 56 may be formed in the base cover 50 for admitting sand, cement, water or any other ballast material into base 12. A cap or plug 58 (FIG. 1) may be used to close the filling port 56 and seal the ballast within the base. The ballast provides support for the entire assembly and prevents its tipping over when a pet climbs or jumps up on one of the platforms.

Cover 50 may be formed with indentations 60 for receiving correspondingly shaped pieces of material 38 (FIG. 1). Material 38 may be glued, stapled, tacked, pressed or otherwise secured within the indentations 60. Once cover 50 is fitted over tube 48 and the bottom of the lower cylindrical segment 52 of the central support column 14 is axially and telescopically inserted over tube 48, the lower platform 16 may be connected to the upper end of the lower segment 52. In this manner, the lower segment 52 serves as a connector tube which interconnects the lower platform 16 to the base 12.

The lower platform 16 is formed with a shallow recess or trough portion 62 and a flat connecting portion 64. An indentation 65 is formed in the trough portion 62 for receiving a complimentary shaped pad of material 38 (FIG. 1). The trough portion 62 provides a comfortable resting surface for a pet such as a small dog or cat.

A hollow cylindrical stub shaft 66 is press fit, glued or otherwise rigidly fixed within a bore 68 formed in the connecting portion 64 of platform 16 so as to extend both above and below the connecting portion 64. The lower end 70 of the stub shaft 66 may be telescopically inserted within the lower segment 52 of the support column with a simple sliding friction fit.

Figure 4:
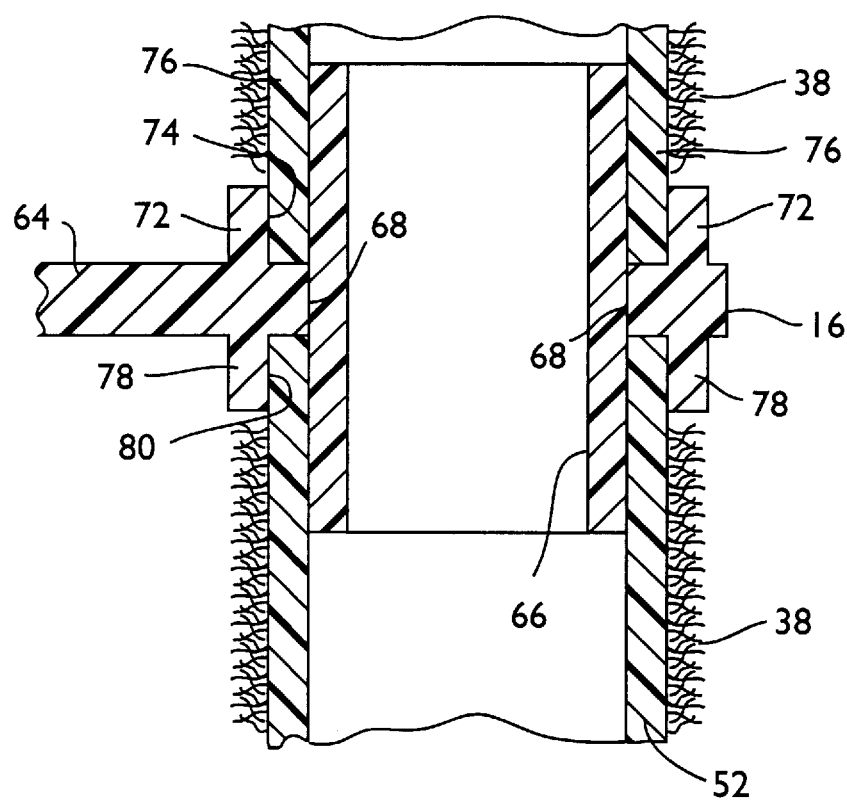
FIG. 4 is a fragmental view in axial section through the center of the lower platform stub shaft and column segments of FIG. 1.

An annular collar or flange 72 is formed concentrically around bore 68 and stub shaft 66 so as to define a cylindrical tubular socket 74 within which the lower end of the upper cylindrical segment 76 of the central support column 14 is tightly inserted. A similar collar 78 is provided on the lower surface or underside of the connecting portion 64 as shown in FIG. 4. A cylindrical tubular socket 80 formed within collar 78 is shown in FIG. 4 as being a mirror image of socket 74.

It can be appreciated that when the tubes 52,76 of the central column 14 are tightly inserted into their respective tubular sockets 74,80, a mutually reinforcing interconnection is formed between the platform 16 and the column segments 52,76.

The upper or second platform 18 includes a hollow cylindrical stub shaft 82 rigidly fixed within a bore formed through the platform. Stub shaft 82 is surrounded by a circular collar 84 on its upper surface and a similar circular collar on its lower surface. The stub shaft and collars of the upper platform are dimensioned the same as those on the lower platform to ensure modular interchange of the upper and lower platforms.

That is, the inner diameter and wall thicknesses of column segments 52 and 76 are preferably the same and the inner diameters and wall thicknesses of tube 48, and stub shafts 66 and 82 are preferably the same. In addition, the inner diameters and wall thicknesses of all collars 70,72,84 etc. are the same so as to allow for modular interchange of the column segments 52,76, etc.

Other column segments may be similarly dimensioned as segments 52,76, but with different axial lengths to allow for varying amounts of vertical separation between the platforms. By dimensioning the stub shafts the same, dimensioning the collars the same, and dimensioning the sockets the same, all of the assembly members become interchangeable with one another in a modular fashion.

The upper platform 18 includes a recess 86 within which a pad of carpet of soft material 38 is mounted. Each platform 16,18 may be oriented in any desired relative position with respect to one another during assembly. Moreover, after assembly, the platforms may be pivoted about column 14 with a manual twisting force around the axis of the column to change or adjust their respective positions.

A third or top column segment 88 having the same radial dimensions as the upper and lower segments 52,76 is axially fitted to and twisted over the top of stub shaft 82 with a tight friction fit. Segment 88 may be shorter than segments 52 and 76, yet may be interchangeable with them if it is desired to adjust the spacing between and/or height of the platforms.

Cap 36 includes a cylindrical mounting base 90 having the same outer diameter as the stub shafts 66,82. Base 90 is press fit into the top of the third column segment 88. A peg 92 is provided on the top of cap 46 for insertion into the bottom end of coil spring 34 so as to anchor bell 32 on the top of the assembly.

Figure 3:
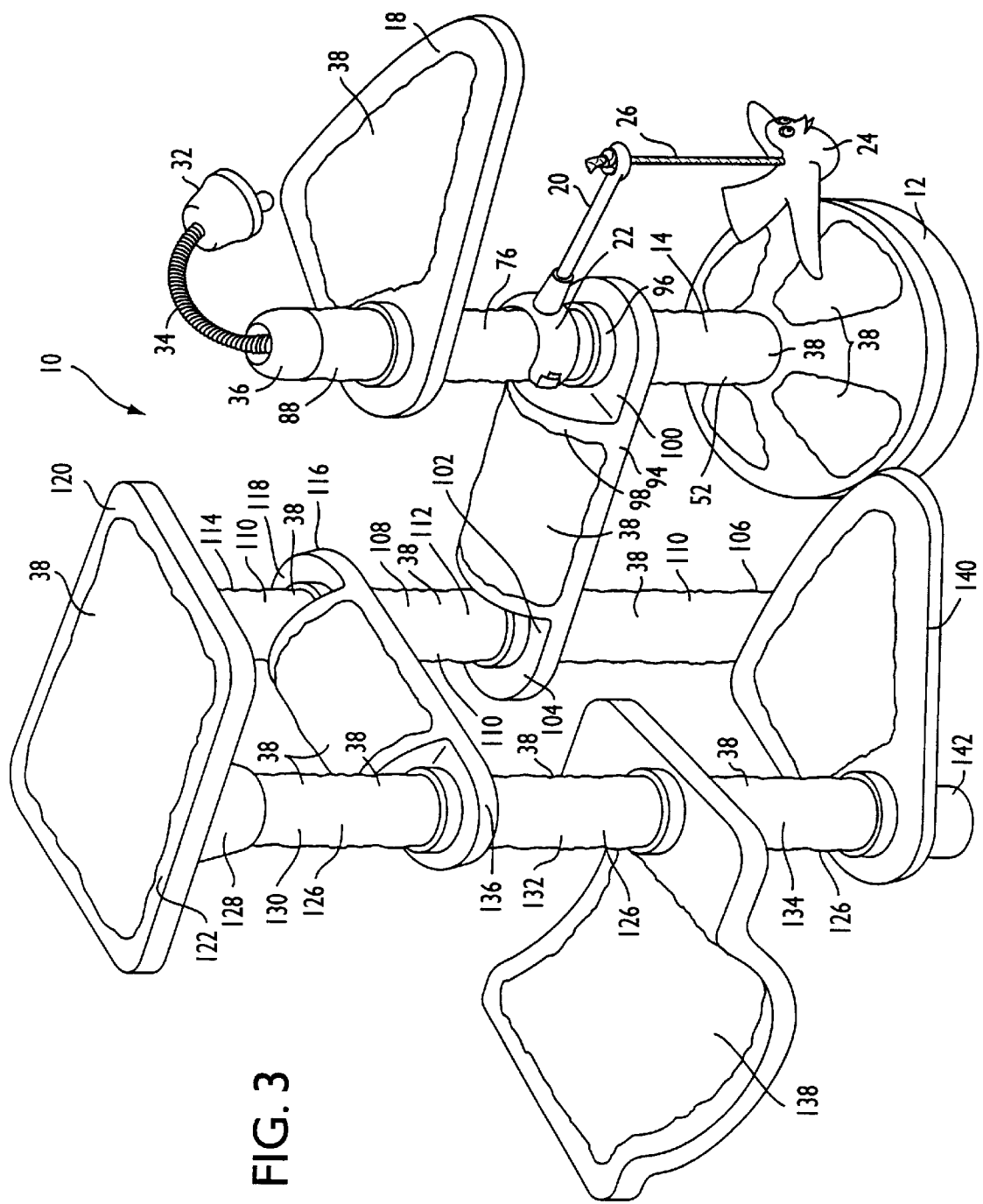
FIG. 3 is a perspective view similar to FIG. 1 depicting expanding on the assembly of FIG. 1; assembly expanding on the assembly of FIG. 1.

A second embodiment of the invention is depicted in FIG. 3 wherein the modular pet furniture assembly 10 is shown in an enlarged and expanded configuration. This embodiment includes an assembly similar to that discussed above with base 12 supporting a central column 14 formed of segments 52,76,88 and upper platform 18. In place of the lower platform 16 as depicted in FIG. 1, this assembly inserts a transverse or horizontal connector 94 between the lower and upper column segments 52,76.

Connector 94 includes the same form of stub shaft and upper and lower collars as provided on the platforms 16,18 noted above so as to define the same size tubular sockets as, for example, sockets 74,80. Only the upper collar 96 on the right end of connector 94 is seen in FIG. 3. A central arched portion 98 extends laterally away from collar 96 and projects upwardly from a first flat end portion 100 of connector 94. The first pair of upper and lower collars on the connector 94 are formed on the first or right flat end portion 100.

A recess is formed on the arched portion 98 for receiving soft material 38. In this case, material 38 provides a gripping and clawing surface for allowing a pet, such as a cat, to walk over and across the connector 94 to an adjoining portion of the furniture assembly.

The opposite or second flat end portion 102 of connector 94 is a mirror image of the first end portion 100 and includes an identical stub shaft, a second pair of upper and lower collars and respective upper and lower tubular sockets. Only the upper collar 104 is seen in FIG. 3. An elongated column segment 106, covered in soft material 38, is inserted rigidly into the lower tubular pocket on the second or left flat end portion 102 of connector 94. The inner and outer diameters of column segment 106 are the same as those of each of the segments which form the support column 14. This ensures the interchangeability and modularity of all column segments.

Column segment 106 may be dimensioned with an axial length or height equal to the combined length or height of base 12 and lower column segment 52. In this manner, the bottom end of column segment 106 may rest directly on the ground, floor or other flat surface and the top end may engage and connect with the tubular socket on the underside of transverse connector 94 so as to support connector 94 in a horizontal plane parallel to the ground, floor or support surface.

It is also possible to dimension column segment 106 the same as column segment 52 and connect column segment 106 to a second base similar to base 12 and still provide a horizontal orientation to connector 94 when column segment 106 is connected to the underside of connector 94 as shown in FIG. 3.

Although the various configurations of furniture assembly 10 are virtually unlimited, FIG. 3 depicts the construction of a second support column 110 from elongated column segment 106, middle column segment 112 and top column segment 114. Each of these segments is shown covered with carpet material 38. In this particular construction, the middle and top column segments 112,114 are each dimensioned the same as and are interchangeable with column segments 52,76 on support column 14.

A second transverse or lateral connector 116 having the same structure and shape as connector 94 has one flat end 118 inserted between the middle and top column segments 112,114 on the second support column 110. A generally rectangular planar top or third platform 120 is connected to the top end of the top column segment 114 to complete the assembly of the second support column 110.

The top platform 120 is formed with a recess for receiving soft material 38 which is maintained within outer rim 122. A pair of cylindrical connecting sockets having the same modular dimensions as all other connecting sockets, such as socket 74 noted above, is provided centrally on opposite end portions of platform 120. One such socket receives the top end of top column 114 and the other socket receives the top end of top column 124 on a third support column 126.

Although the connecting sockets on the underside of top platform 120 are the same as all other sockets, the collars which surround them may be formed as frustoconical collars as exhibited by collar 128. This truncated conical shape provides a stronger connection with a thicker wall section adjacent the underside of the top platform 120. The lateral spacing of the sockets on the top platform is the same as the lateral spacing between the sockets on the lateral connectors.

The third support column 126 is constructed from three modular column segments, namely, top segment 130, middle segment 132 and lower segment 134. Each of these segments is dimensioned the same as all of the previously mentioned segments except for a length which is shorter than the elongated segment 106 on the second support column and longer than the short top segment 88 on the first support column 14.

The lower end of top segment 130 is inserted into a standard connecting socket on the top surface of the other flat end portion 136 of the second lateral connector 116, and the top end of the middle segment 132 is inserted into a similar socket on the bottom surface of each portion 136 of connector 116. The lower end of the middle segment 132 of the third support column 126 is inserted into a platform 138 which is substantially identical to the lower platform 16 noted above.

The upper end of the lower column segment 134 is inserted into the socket on the bottom of platform 138 and the lower end of column segment 134 is inserted into the socket on the top surface of a bottom platform 140 which is substantially identical to the upper platform 18 noted above.

It should be noted that the height and shape of stub shaft 142 on platform 140 is about the same as the height and shape of tube 48 in base 12 (FIG. 1). The bottom or blind end of the upper socket formed on platform 140 is maintained at about the same height as support surface 144 on base 12. Thus, both lower segment 134 on the third support column 126 and the lower segment 52 on the first support column 14 extend vertically to the same height above the flat floor upon which they rest.

The elongated lower column segment 106 on the second column 110 has a height equal to the combined heights of base 12 and column segment 52 and also equal to the combined heights of platform 140 and column segment 134. This equality of heights ensures modularity between the respective support columns 14,110,126 and ensures that the lateral connectors 94 and 116 will be aligned horizontally between the adjacent columns to which they are interconnected.

This dimensioning also ensures that each tubular segment on each column will be fully seated concentrically within each complimentary socket formed on the base, lateral connectors and platforms. Moreover, this modularity ensures that each column segment and each stub shaft in each respective column will be aligned coaxially with one another so as to result in an orthogonal construction with the support columns extending vertically and the lateral connectors extending horizontally and perpendicularly with respect to the support columns.

Since relative rotation of the platforms and lateral connectors is possible within each segment, each support column may be rotated with respect to each adjoining column to provide virtually any shape desired. That is, the columns may be aligned in a series as in a straight row, curved in an arc, closed in form as a triangle, circle, square or the like (depending on the number of support columns constructed in a given assembly), arranged in a zig zag configuration or any other random shape. This allows the shape and size of the pet furniture assembly to be customized for a particular pet and/or for a particular floor space.

In some cases, it is desirable to provide greater support to the platforms 16 than can be provided by the cantilevered platform mountings noted above. For example, a heavy pet can potentially overturn or tip an assembly 10 when vigorously jumping on or off a platform 16. To prevent such tipping or teetering, the assemblies shown in FIGS. 5, 6 and 7 have been designed to firmly support, stabilize and anchor each platform between a pair of rectangular bases.

Figure 5:
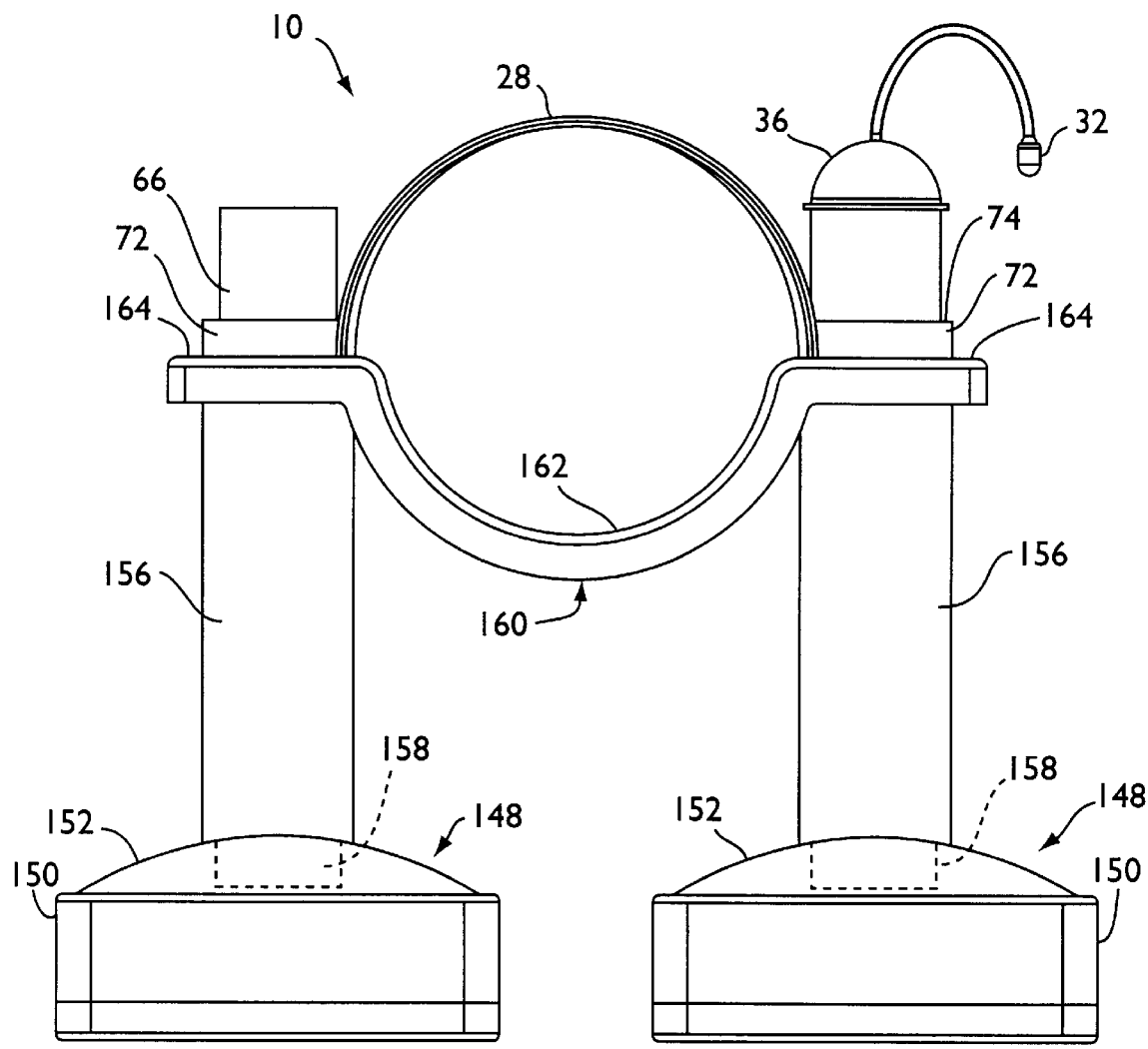
FIG. 5 is a front elevation view of an alternate embodiment of the invention wherein a platform is mounted between a pair of support columns.
Figure 7:
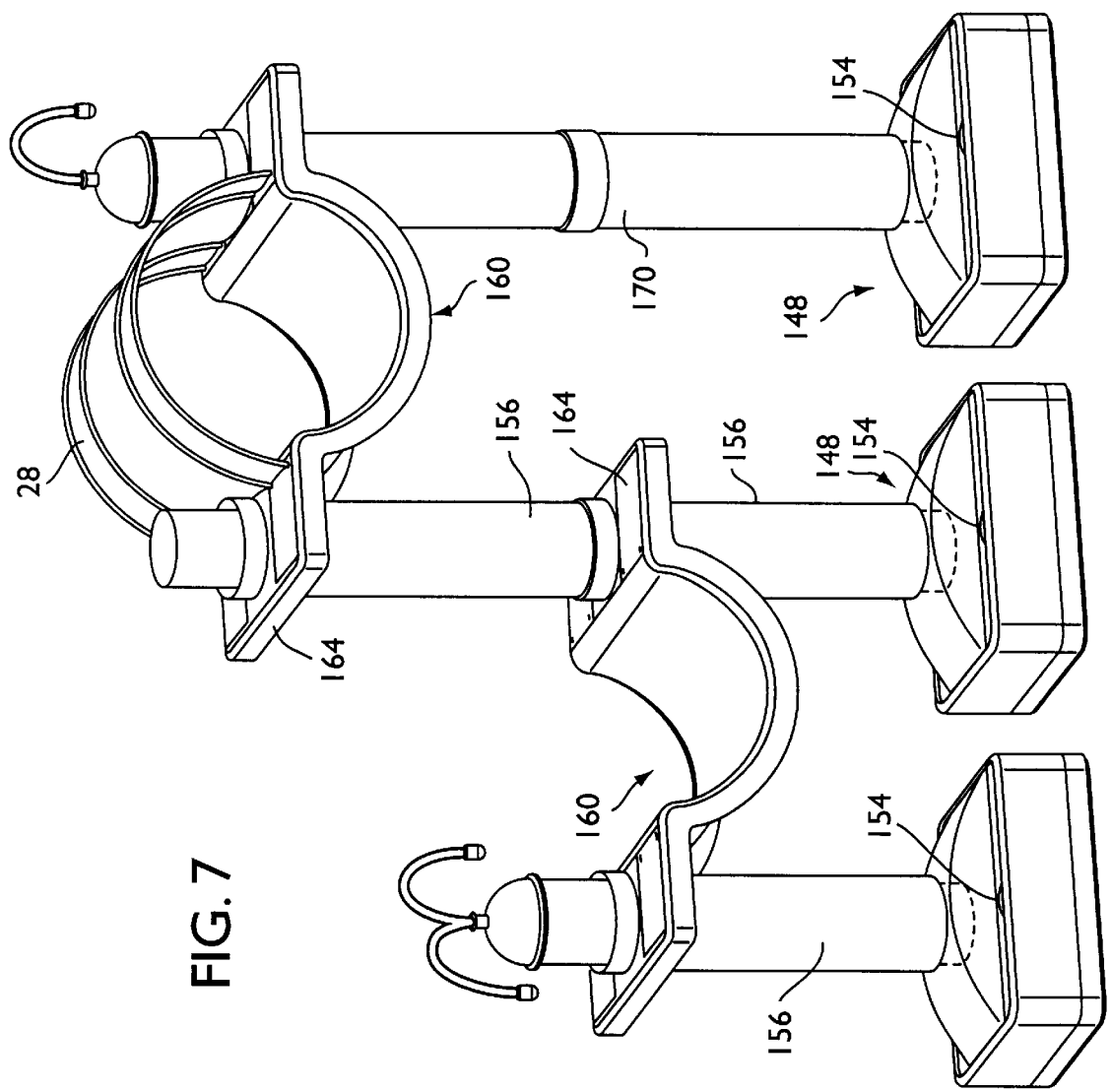
FIG. 7 is a perspective view showing a further expanded embodiment of FIG. 5 and 6.

As seen in FIG. 5, assembly 10 includes a pair of rectangular bases 148 each formed with four rectangular side walls 150 and an arched cover 152. Ballast is provided in each base 148 through a fill hole 154 as shown in FIG. 7. Fill hole 154 may be plugged after filling. Support columns 156 are plugged into the bases 148 with a tight friction fit.

Each support column is formed with a radially stepped cylindrical plug end 158 which is forced into a circular bore formed in the top center of each arched cover 152. The arch in the cover 152 provides a vertical clearance space above the ballast for receiving plug end 158. The radial step in the support column 156 rests on top of the arched cover for stability.

A platform 160, which is supported between the bases 148, includes a central trough 162 which provides a resting area for a pet. Trough 162 is bordered on opposite sides by a pair of flat connecting portions 164 which are respectively connected to support columns 156 in the same manner as platform 16 is connected to the lower column segment 52 as described above. Moreover, all connections between support columns 156 and platform 160 are compatible for connection within the embodiments noted previously in FIGS. 1 through 4. A cap 36 may be attached to either support column 156 for supporting a toy 32.

A stub shaft 66 and collar 72 are provided on each connecting portion 164 in the same fashion as that on platform 16 so as to define a tubular socket 74. A ribbed canopy 28 may be mounted over trough 162 as described below. It can be appreciated that the assembly 10 of FIG. 5 provides a high degree of stability to the platform 160 mounted midway between the support columns 156.

Figure 6:
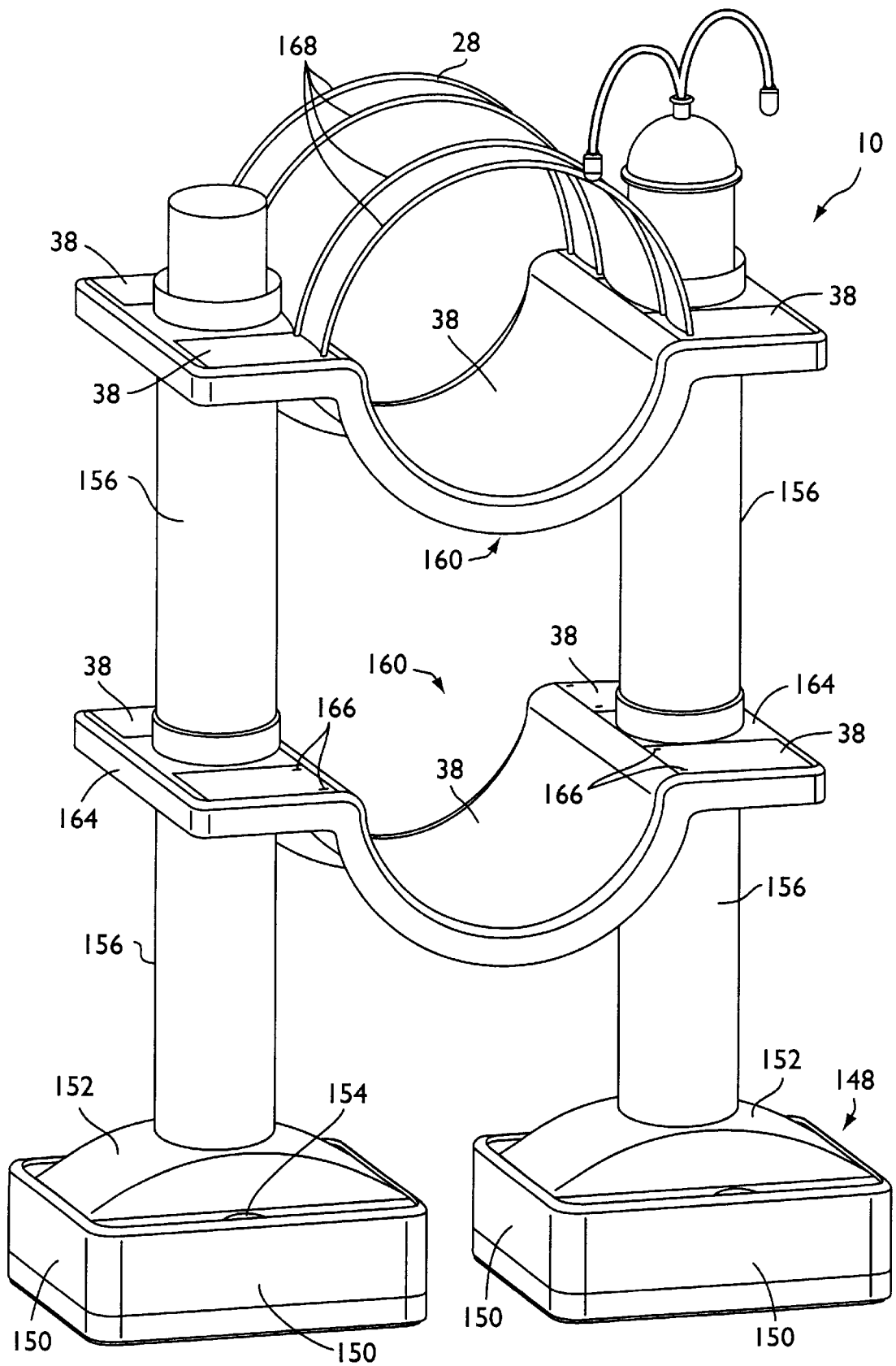
FIG. 6 is a perspective view showing an expanded embodiment based on the construction of FIG. 1.

The assembly 10 of FIG. 5 may be expanded or enlarged as shown in FIG. 6 to include a pair of platforms 160, one mounted directly above the other in modular fashion. Mounting holes 166 are formed in each connecting portion 164 for receiving the free ends of the wire braces 168 in canopy 28. Carpeting 38 may be mounted to assembly 10 as desired in the manner and locations discussed above with respect to FIGS. 1–4.

A further expanded assembly 10 is shown in FIG. 7 wherein three bases 148 are interconnected by two platforms 160. The lower platform 160 shown on the left in FIG. 7 is mounted below the upper platform 160 and is laterally displaced or offset from the upper platform. However, one connecting portion 164 of the lower platform is aligned beneath one connecting portion of the upper platform along a common segmented support column.

Instead of interconnecting two short support columns 156, a single support column 170 may be substituted to provide a double height column for simplicity of assembly. The height of column 170 is about equal to the combined heights of the two shorter support column segments 156,156. Although each base 148 in FIG. 7 is shown aligned in a straight row, any one of the bases may be moved out of the alignment shown to form any desired pattern as discussed above insofar as each joint is rotatable.

There has been disclosed heretofore the best embodiment of the invention presently contemplated. However, it is to be understood that various changes and modifications may be made thereto without departing from the spirit of the invention.

What is claimed is:

1. A modular pet furniture assembly, comprising,:
   a base;
   first and a second support columns connected to said base, said first and second support columns each comprising first and second segments; and
   a first platform with a first pair of sockets and a second pair of sockets, said first pair of sockets friction fitted with said first and second column segments of said first support column, and said second pair of sockets friction fitted with said first and second column segments of said second support column.

2. The assembly of claim 1, wherein said base comprises a hollow base.

3. The assembly of claim 2, further comprising ballast material disposed within said base.

4. The assembly of claim 1, wherein said first platform is cantilevered on said support column.

5. The assembly of claim 1, further comprising a second platform cantilevered on said support column.

6. The assembly of claim 5, further comprising a third column segment and wherein said second platform is connected to said support column between said second and third column segments.

7. The assembly of claim 1, wherein said first platform comprises first and second sockets respectively receiving said first and second column segments.

8. The assembly of claim 1, further comprising a pet toy connected to said support column.

9. The assembly of claim 1, wherein said first platform is pivotally connected to said support column.

10. The assembly of claim 1, wherein each of said first and second column segments comprises substantially identical cylindrical tubes.

11. The assembly of claim 1, wherein said first platform comprises a stub shaft and wherein said first and second column segments and said stub shaft are interengaged and aligned coaxially along said support column.

12. A modular pet furniture assembly, comprising:
   a first support column comprising first and second column segments;
   a platform connected to said first support column;
   a second support column comprising first and second column segments; and
   a first connector laterally interconnecting said first and second support columns, said connector comprising a first pair of sockets interconnecting said first and second column segments on said first support column, and a second pair of sockets interconnecting said first and second column segments on said second support column.

13. The assembly of claim 12, further comprising a weighted base supporting said first support column.

14. The assembly of claim 12, further comprising a soft padding material provided on said platform.

15. The assembly of claim 12, further comprising a third support column comprising first and second column segments and a second connector laterally interconnecting said second and third support columns.

16. The assembly of claim 12, wherein each socket of said first and second pairs of sockets comprises a bore surrounded by a tubular wall and a stub shaft fixed within said bore.

17. The assembly of claim 12, further comprising a soft padding material provided on said first and second support columns, on said platform and on said first connector.

18. The assembly of claim 12, wherein said first support column is relatively pivotable with respect to said second support column by pivoting about said first connector.

19. The assembly of claim 12, further comprising a base connected to said first column segment of said first support column and wherein said base and said first column segment of said first support column comprise a combined height equal to the height of said first column segment of said second support column.

20. The assembly of claim 12, wherein said connector comprises a pair of flat end portions and an arched central portion.

21. A modular pet furniture assembly, comprising:

a first base;

a second base;

a first support column having a bottom end portion removably connected to said first base;

a second support column having a bottom end portion removably connected to said second base; and a first platform extending between and interconnecting said first and second support columns, said first platform comprising a central portion for supporting a pet and first and second connecting portions provided on opposite sides of said central portion and wherein said connecting portions are respectively removably connected to said first and second support columns, and wherein said connecting portions have tubular sockets by which the connecting portions are friction fitted with the support columns.

22. The assembly of claim 21, wherein said first and second bases comprise hollow rectangular bases adapted for receiving ballast.

23. The assembly of claim 21, further comprising a third support column connected to said first connecting portion, a fourth support column connected to said second connecting portion, and a second platform interconnecting said third and fourth support columns.

24. The assembly of claim 23, wherein said second platform is mounted above said first platform.

25. A modular pet furniture assembly, comprising:

a first base;

a second base;

a first support column having a bottom end portion removably connected to said first base;

a second support column having a bottom end portion removably connected to said second base;

a first platform extending between and interconnecting said first and second support columns, said first platform comprising a central portion for supporting a pet and first and second connecting portions provided on opposite sides of said central portion and wherein said connecting portions are respectively removably connected to said first and second support columns;

a third support column connected to said first support column;

a third base;

a double length support column connected to said third base, said double length support column having a length about equal to the combined lengths of said first and third support columns; and a second platform interconnecting said third column and said double length support column.

* * * * *